US012445786B2

(12) United States Patent
Sunohara et al.

(10) Patent No.: US 12,445,786 B2
(45) Date of Patent: Oct. 14, 2025

(54) ACTIVE NOISE CONTROL FOR SOUND QUALITY IN HEARING DEVICES

(71) Applicant: Starkey Laboratories, Inc., Eden Prairie, MN (US)

(72) Inventors: Masahiro Sunohara, Plymouth, MN (US); Henning Schepker, Oldenburg (DE); Martin McKinney, Minneapolis, MN (US); Piero Iared Rivera Benois, Bad Zwischenahn (DE)

(73) Assignee: Starkey Laboratories, Inc., Eden Prairie, MN (US)

( * ) Notice: Subject to any disclaimer, the term of this patent is extended or adjusted under 35 U.S.C. 154(b) by 258 days.

(21) Appl. No.: 18/446,808

(22) Filed: Aug. 9, 2023

(65) Prior Publication Data

US 2024/0064477 A1 Feb. 22, 2024

Related U.S. Application Data

(60) Provisional application No. 63/396,313, filed on Aug. 9, 2022.

(51) Int. Cl.

*H04R 25/00* (2006.01)
*G10K 11/178* (2006.01)

(52) U.S. Cl.

CPC ..... *H04R 25/453* (2013.01); *G10K 11/17873* (2018.01); *H04R 25/505* (2013.01); *H04R 25/554* (2013.01)

(58) Field of Classification Search

CPC .. H04R 25/453; H04R 25/505; H04R 25/554; H04R 1/1083; H04R 2225/41; H04R 2460/01

(Continued)

(56) References Cited

U.S. PATENT DOCUMENTS 7,817,803 B2 * 10/2010 Goldstein ............ H04R 1/1083 381/72
8,229,127 B2 7/2012 Jorgensen et al.
(Continued)

FOREIGN PATENT DOCUMENTS

EP 2519033 12/2017
EP 3681175 6/2022

OTHER PUBLICATIONS

Benade, A H, "On the Propagation of Sound Waves in a Cylindrical Conduit", J. Acoust. Soc. Am. 44, (1968), 616-623.
(Continued)

*Primary Examiner* — Phylesha Dabney
(74) *Attorney, Agent, or Firm* — Schwegman Lundberg & Woessner, P.A.

(57) ABSTRACT

Disclosed herein, among other things, are systems and methods for active noise cancellation (ANC) for hearing device applications. A method includes estimating a first sound pressure on an ear drum of a wearer of the hearing device caused by a hearing processing signal, estimating a second sound pressure on the ear drum of the wearer of the hearing device caused by a leakage path of the hearing device, and computing a ratio of the first sound pressure and the second sound pressure to predict a comb-filtering effect for the hearing device. The method also includes computing an ANC controller using the computed ratio in one or more frequency ranges, and canceling leaked sound into an ear canal of the wearer for the hearing device in the one or more frequency ranges using the ANC controller.

20 Claims, 9 Drawing Sheets

(58) Field of Classification Search
USPC .......................................................... 381/318
See application file for complete search history.

(56) References Cited

U.S. PATENT DOCUMENTS

| | | | | |
|---|---|---|---|---|
| 11,109,166 | B2 * | 8/2021 | Jensen | H04R 25/505 |
| 11,297,443 | B2 | 4/2022 | Eichfeld et al. | |
| 2020/0221236 | A1 * | 7/2020 | Jensen | H04R 25/554 |
| 2020/0245080 | A1 * | 7/2020 | Eichfeld | G10K 11/17881 |

OTHER PUBLICATIONS

Bisgaard, Nikolai, "Standard Audiograms for the IEC 60118-15 Measurement Procedure", Trends in Amplification, 14(2), (2010), 113-120.
Kates, J, "The Hearing-aid Speech Quality Index (HASQI) version 2", Journal of the Audio Engineering Society, 62 (3), (2014), 99-117.

* cited by examiner

ACTIVE NOISE CONTROL FOR SOUND QUALITY IN HEARING DEVICES

CLAIM OF PRIORITY AND INCORPORATION BY REFERENCE

The present application claims the benefit under 35 U.S.C. § 119(e) of U.S. Provisional Patent Application 63/396,313, filed Aug. 9, 2022, the disclosure of which is hereby incorporated by reference herein in its entirety.

TECHNICAL FIELD

This document relates generally to hearing device systems and more particularly to active noise cancellation (ANC) to mitigate comb-filtering effects for hearing devices.

BACKGROUND

Examples of hearing devices, also referred to herein as hearing assistance devices or hearing instruments, include both prescriptive devices and non-prescriptive devices. Specific examples of hearing devices include, but are not limited to, hearing aids, headphones, assisted listening devices, and earbuds.

Hearing aids are used to assist patients suffering hearing loss by transmitting amplified sounds to ear canals. In one example, a hearing aid is worn in and/or around a patient's ear. Hearing aids may include processors and electronics that improve the listening experience for a specific wearer or in a specific acoustic environment.

The superposition of sound processed through a hearing aid and the direct sound leaking into the ear canal can cause comb-filtering effects that degrade the perceived sound quality for a wearer of the hearing aid. Several solutions have already been proposed to mitigate the comb-filtering effects. One of the proposed methods is an attempt to reduce the comb-filtering effect by using an ANC technique, which tries to achieve its goal by canceling only the leaked direct sound using ANC. This method is advantageous in terms of auditory compensation because it does not require modification of the hearing aid processing sound and allows lower frequency range of the hearing aid processing sound to reach the ear drum without being affected by comb-filtering.

However, there are several problems with the conventional method of using ANC to mitigate the comb-filtering effect. First, ANC is basically a noise reduction function and is not optimized in terms of reducing the comb-filtering effect. Second, a waterbed effect of ANC may increase leaked direct sound, which may in turn emphasize the comb-filtering effect. Third, the cancellation response of the ANC may cause it to deviate from the desired hearing target responses, which is determined by the user's hearing loss profile. Fourth, comb-filtering does not always occur in the same way and varies depending on the gain of hearing aid, structure of the acoustic vent, the level of the input signal to the hearing aid, and the delay time of the hearing aid.

Improved methods of active noise cancellation to mitigate comb-filtering effects for hearing devices are needed.

SUMMARY

Disclosed herein, among other things, are systems and methods for active noise cancellation (ANC) for hearing device applications, including providing improvements in sound-quality by efficiently combining information from hearing aid gain and ANC to suppress comb-filtering artifacts without deviating from desired targets. A method includes estimating a first sound pressure on an ear drum of a wearer of the hearing device caused by a hearing processing signal, estimating a second sound pressure on the ear drum of the wearer of the hearing device caused by a leakage path of the hearing device, and computing a ratio of the first sound pressure and the second sound pressure to predict a comb-filtering effect for the hearing device. The method also includes computing an ANC controller using the computed ratio in one or more frequency ranges, and canceling leaked sound into an ear canal of the wearer for the hearing device in the one or more frequency ranges using the ANC controller.

Various aspects of the present subject matter include a hearing device including a microphone and hearing assistance electronics, including one or more processors. The one or more processors are programmed to estimate a first sound pressure on an ear drum of a wearer of the hearing device caused by a hearing processing signal, estimate a second sound pressure on the ear drum of the wearer of the hearing device caused by a leakage path of the hearing device, and compute a ratio of the first sound pressure and the second sound pressure to predict a comb-filtering effect for the hearing device. The one or more processors are also programmed to compute an ANC controller using the computed ratio in one or more frequency ranges, and cancel leaked sound into an ear canal of the wearer for the hearing device in the one or more frequency ranges using the ANC controller.

This Summary is an overview of some of the teachings of the present application and not intended to be an exclusive or exhaustive treatment of the present subject matter. Further details about the present subject matter are found in the detailed description and appended claims.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

DETAILED DESCRIPTION

Figure 1A:
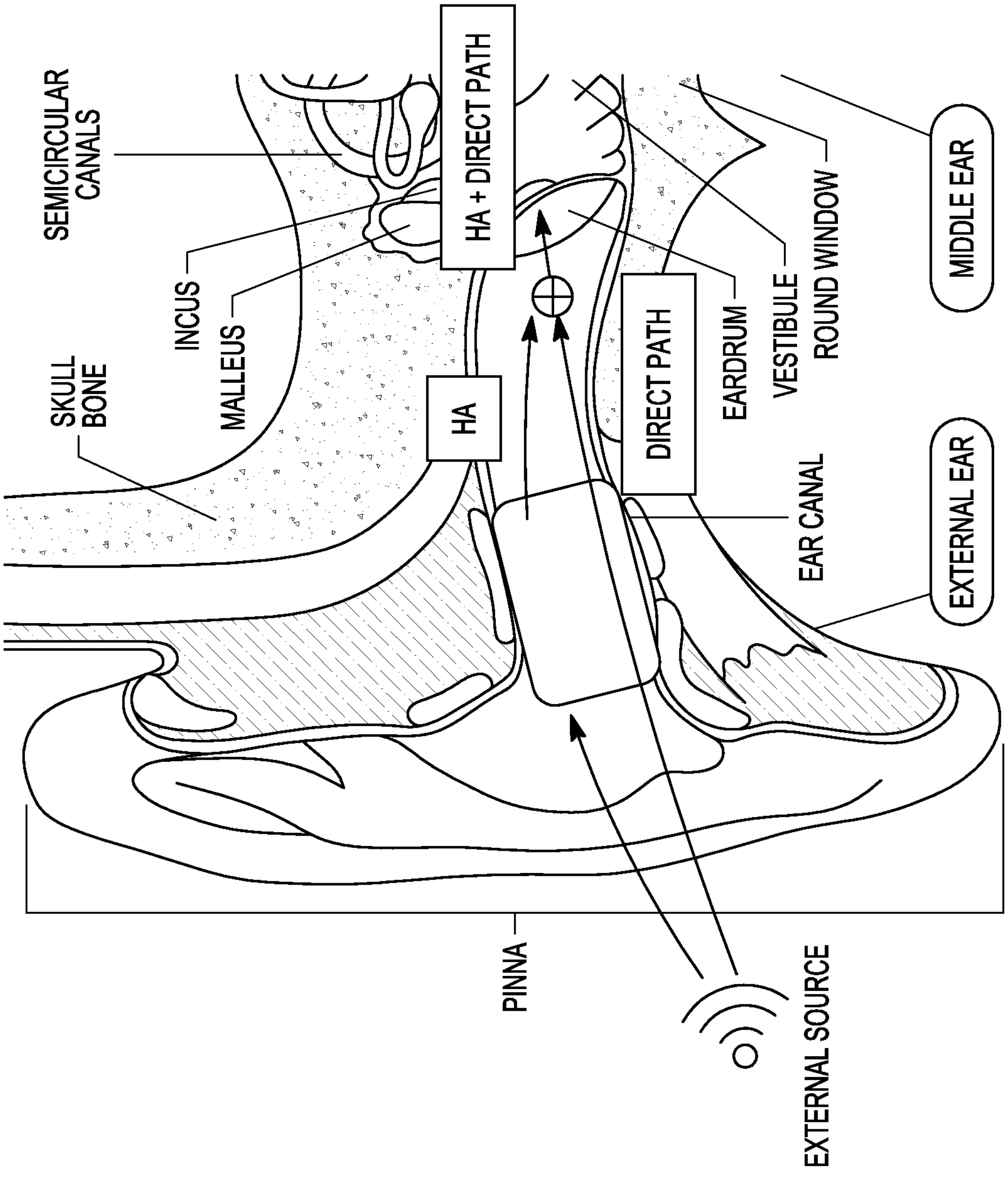
FIG. 1A illustrates components of audio that create the comb-filtering effect for hearing devices.

The following detailed description of the present subject matter refers to subject matter in the accompanying drawings which show, by way of illustration, specific aspects and examples in which the present subject matter may be practiced. These examples are described in sufficient detail to enable those skilled in the art to practice the present subject matter. References to "an", "one", or "various" examples or embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

The present detailed description will discuss hearing devices generally, including earbuds, headsets, headphones and hearing assistance devices using the example of hearing aids. Other hearing devices include, but are not limited to, those in this document. It is understood that their use in the description is intended to demonstrate the present subject matter, but not in a limited or exclusive or exhaustive sense.

The superposition of sound processed through a hearing aid and the direct sound leaking into the ear canal can cause comb-filtering effects that degrade the perceived sound quality. Hearing aid wearers often perceive the effect as unnatural or as environment distortions. Common methods to mitigate comb-filtering effects include adjusting occlusion to limit direct sound input and adjusting hearing aid amplification to limit the amount of interaction. These two options are often employed together to achieve a delicate balance between wearer comfort, providing the required amplification, and sound quality.

The present subject matter relates to the use of active noise cancelation (ANC) to mitigate comb-filtering effects in hearing aids to balance wearer comfort, providing the required amplification, and improving sound quality. Specifically, the present subject matter combines ANC with conventional hearing aid processing, by using ANC to generate an anti-phase signal configured to mitigate comb-filtering effects of a hearing assistance device by actively suppressing audio signals leaking into an ear canal of a wearer of the hearing assistance device.

In various examples, the present subject matter provides a method to address the comb-filtering effect issues for hearing aids, which leads to a degradation of the naturalness or speech intelligibility for the hearing aid users. The present subject matter provides a method which incorporates active noise cancellation (ANC) techniques optimized to mitigate the comb-filtering effect and improve the sound quality of hearing aids. The present subject matter predicts the occurrence of user's comb-filtering effect that occurs depending on acoustic vent structure or gain of hearing aid processing, to optimize the design of an ANC controller such that the comb-filtering effect is reduced or eliminated.

Figure 1B:
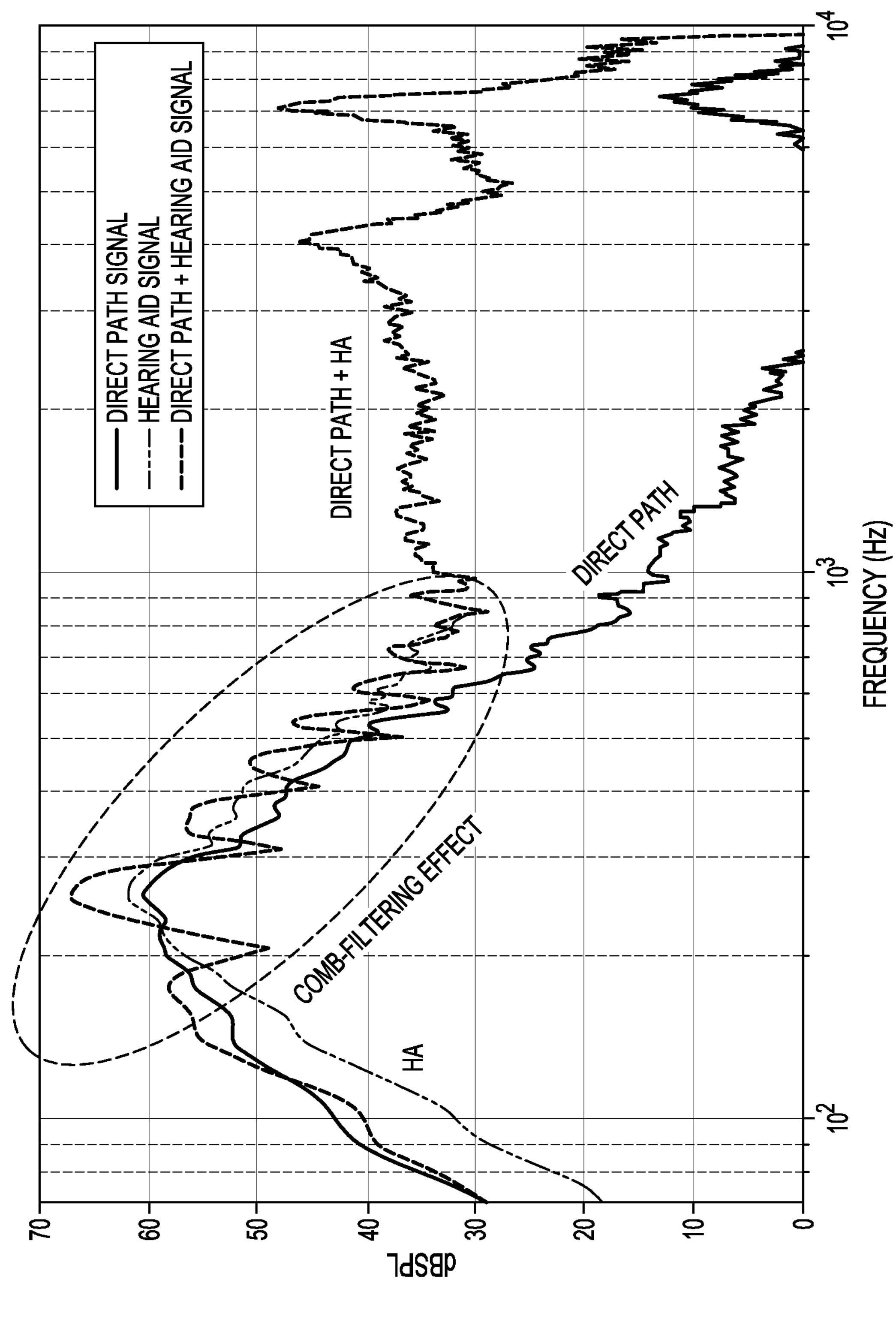
FIG. 1B illustrates a graphical diagram of components of audio that create the comb-filtering effect for hearing devices.

The superposition of sound processed through a hearing aid and the direct sound leaking into the ear canal can cause "comb-filtering effects" that degrade the perceived sound quality as shown in FIGS. 1A and 1B. Several solutions have already been proposed to mitigate the effect. One of the proposed methods is an attempt to reduce the comb-filtering effect by using ANC technique, which tries to achieve its goal by canceling only the leaked direct sound by ANC. This method is advantageous in terms of auditory compensation because it does not require modification of the hearing aid processing sound and allows lower frequency range of the hearing aid processing sound to be sent to the ear drum.

Figure 1C:
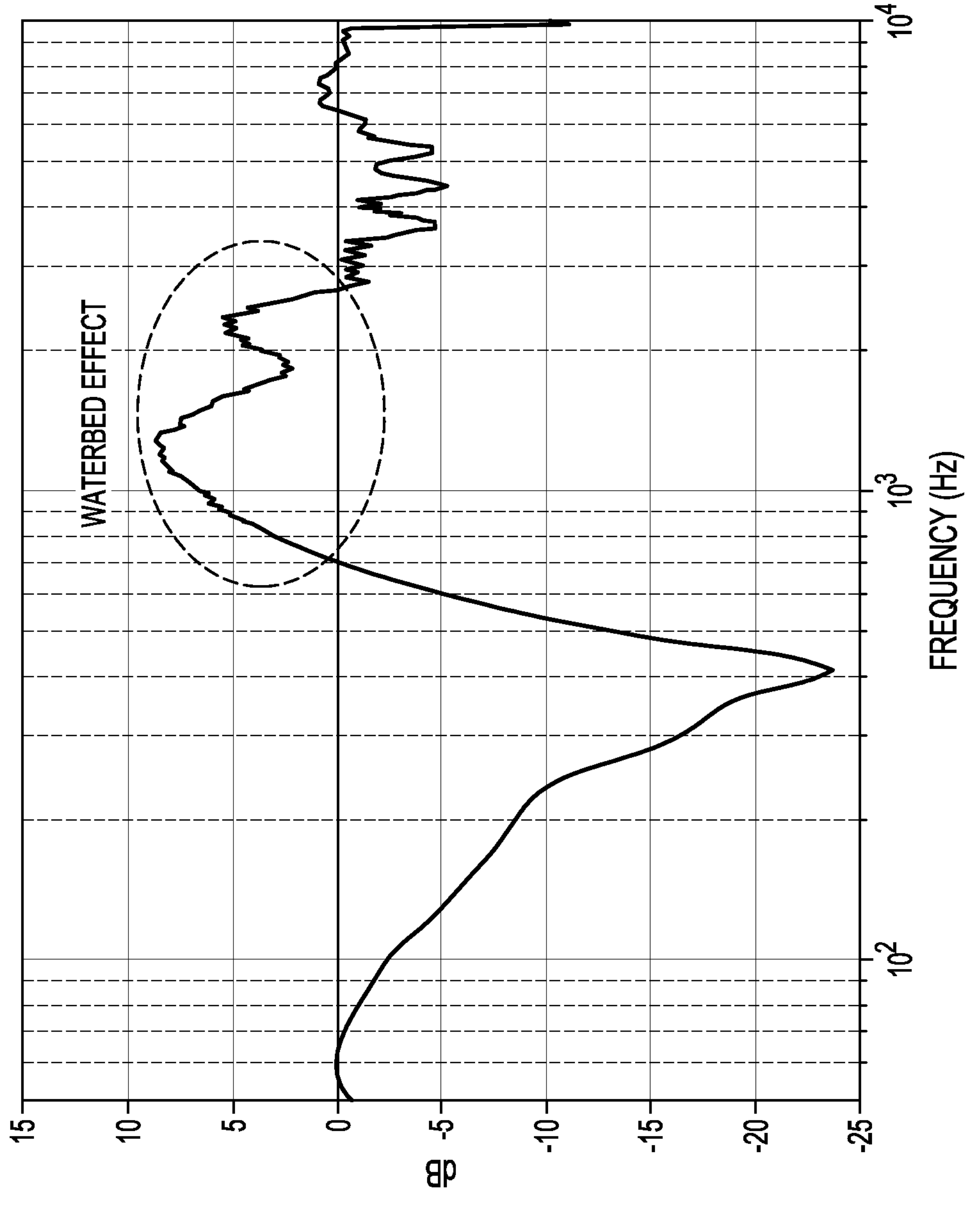
FIG. 1C illustrates a graphical diagram of the waterbed effect of active noise cancellation for hearing devices.

However, there are several problems with the conventional method of using ANC to mitigate the comb-filtering effect, as shown below. First, ANC is basically a noise reduction function and is not optimized for reducing the comb-filtering effect. Second, the waterbed effect of ANC (where noise is amplified outside the desired frequency band as shown in FIG. 1C) may increase leaked direct sound, which may in turn emphasize the comb-filtering effect. Third, the cancellation response of the ANC may cause it to deviate from the desired hearing target responses, which is determined by user's hearing loss profile. Fourth, comb-filtering does not always occur in the same way and varies depending on the gain of hearing aid, structure of the acoustic vent, the level of the input signal to the hearing aid, the delay time of the hearing aid, etc.

The present subject matter mitigates the comb-filtering effect more effectively by first predicting the occurrence of the comb-filtering effect for the wearer by multiple means and then designing an ANC controller optimized to minimize the occurrence of the comb-filtering effect based on such prediction.

In one example, the present subject matter includes inward-facing microphone to monitor the sound pressure in the ear canal, feed-forward or feed-back type ANC (or a feedforward-feedback combined approach) is provided using the inward-facing microphone to cancel only the direct leaked sound into the ear canal and suppress the comb-filtering effect, and the ANC is optimized to minimize the comb-filtering effects at the ear drum.

In various examples, the present subject matter reduces the comb-filtering effect by predicting sound pressure on the ear drum by the hearing processing signal, predicting sound pressure on the ear drum by the leakage path, predicting the comb-filtering effect (frequency range and ripple width), and designing an ANC controller for the hearing device using the prediction.

In some examples, prediction of sound pressure on the ear drum by the hearing processing signal, such as multi-channel compression processing, includes determining the gain, TK (Threshold knee point), and compression ratio for each band from prescription formulas (NAL-NL2, etc.). The main input parameters to its prescription are the user's hearing loss level and acoustic properties, for example, vent-in/vent-out functions. These acoustic properties can be estimated by using an electroacoustic model based on the vent structure, or actual measurement by the user with probe tube microphone, in various examples. The transfer function from the sound source to the ear drum or relative to a known position from the ear drum is also used, and can be estimated by actual measurement by a user with a probe tube microphone, using a KEMAR's measurement as an averaged ear, or using an electroacoustic model (FEM, etc.). The transfer function from the receiver to the ear drum is also used, and can be estimated using the actual measurement of a user's feedback path, which is the transfer function from the receiver to the inward-facing microphone, a KEMAR's measurement as an averaged ear, or prediction by electroacoustic models.

In some examples, prediction of sound pressure on the ear drum by the leakage path includes using a transfer function from an external source to the ear drum (leakage path), which can be estimated using a measurement done with the user and a probe tube microphone, a KEMAR's measurement as an averaged ear, or prediction by electroacoustic models.

In various examples, the comb-filtering effect (frequency range and ripple width) is predicted using a ratio of the above prediction of sound pressure on the ear drum by the hearing processing signal and the above prediction of sound pressure on the ear drum by the leakage path, referred to herein as $R_{cf}(f)$:

$$R_{cf}(f)=|20\log_{10}\{|P_L(f)|/|P_{HA}(f)|\}|, \text{ where}$$

$P_{HA}(f)$ is predicted sound pressure on the ear drum by the hearing processing signal, and $P_L(f)$ is predicted sound pressure on the ear drum by the leakage path.

In various examples, the closer $R_{cf}(f)$ is to 0 dB, the more likely the comb-filtering effect will be generated.

Figure 2A:
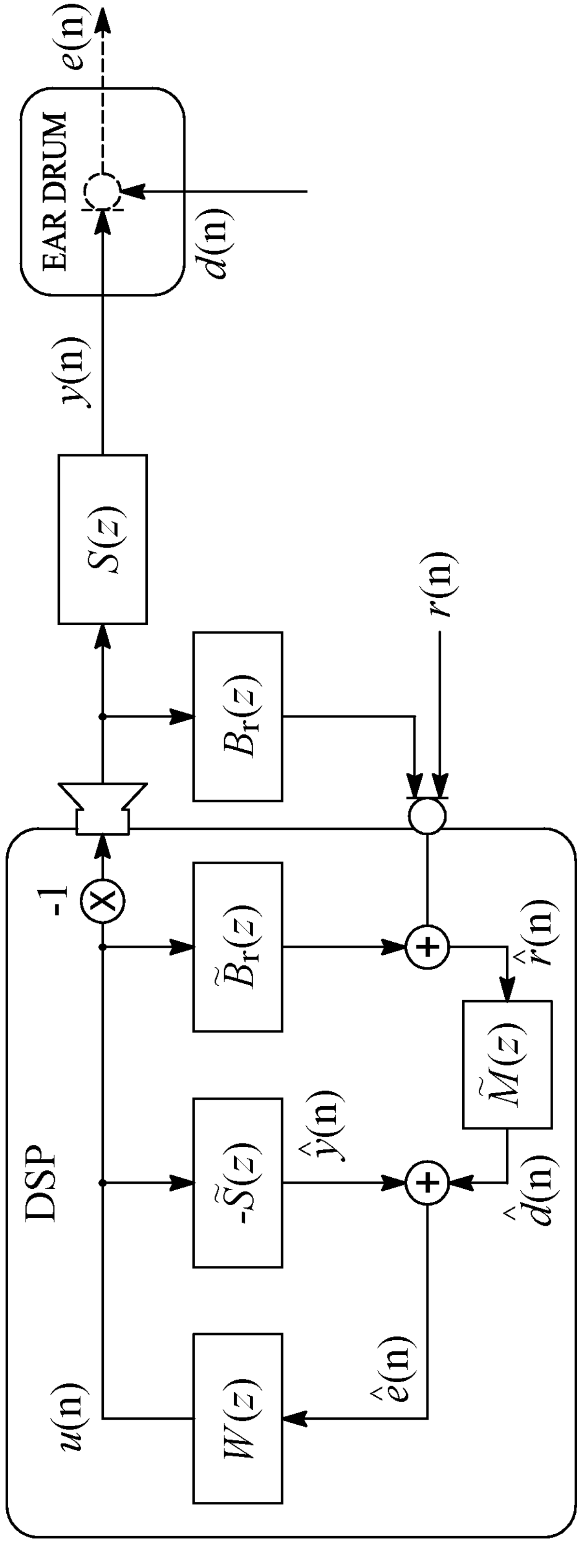
FIG. 2A illustrates a system for active noise canceling for a hearing device, according to various examples of the present subject matter.
Figure 2B:
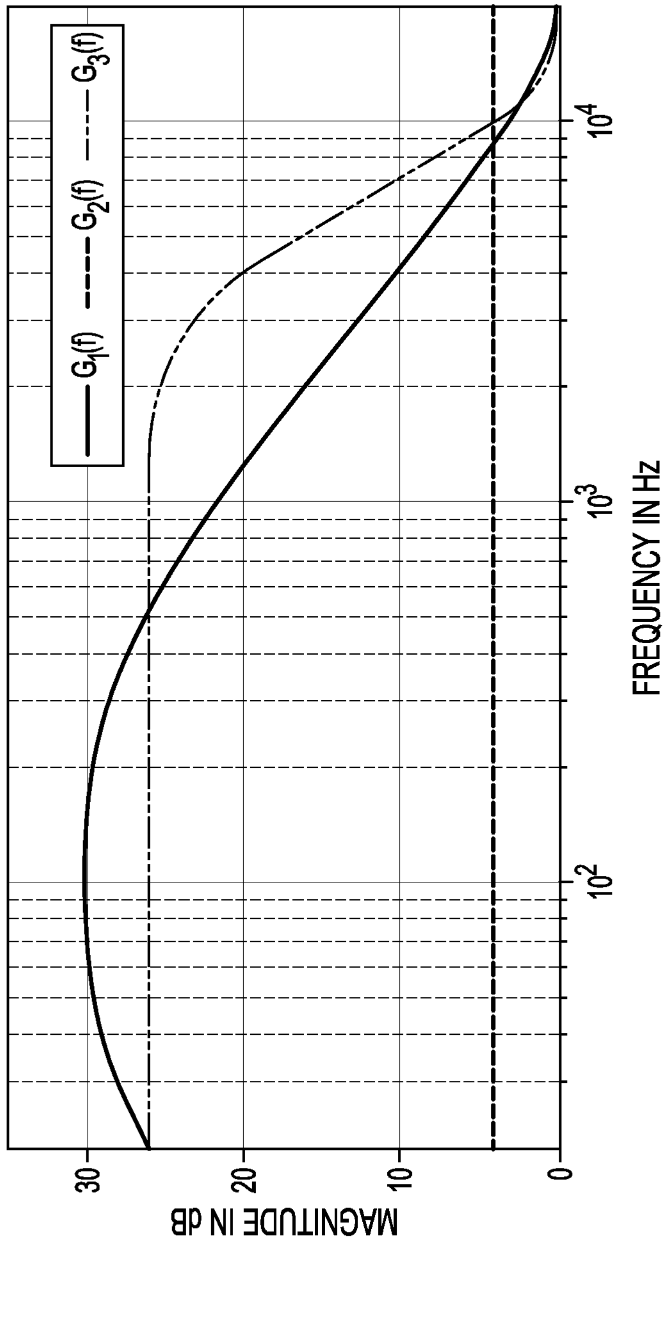
FIG. 2B illustrates a graphical diagram of frequency-weighting functions used to optimize the ANC controller, according to various examples of the present subject matter.

The present subject matter designs a controller for ANC to mitigate the comb-filtering effect. In some examples, the present subject matter uses static feedback ANC or static feedforward ANC, or both. Based on $R_{cf}(f)$ predicted above, the present subject matter designs the ANC controller to enhance ANC cancellation performance in frequency range, where the $R_{cf}(f)$ is closer to 0 dB as much as possible, as shown in FIG. 2D.

The current state-of-the-art ANC algorithms use virtual sensing to achieve a minimization of the sound pressure directly at the ear drum. These algorithms require a two-stage approach. In the first stage, called the calibration stage, the acoustic transfer functions between the hearing aid and the ear drum ($\Phi_{dr}(z)$, $\Phi_{rr}(z)$) are measured by measuring the transfer function between the receiver and ear drum S(z) using a probe tube microphone (PTM), generating an external calibration sound field and measuring the transfer function between the inward-facing microphone and the PTM (the ear drum)

$$M(z)=\frac{\Phi_{dr}(z)}{\Phi_{rr}(z)},$$

repeating the first two measurements C times by re-inserting the hearing aid, and measuring the transfer function between the receiver and the inward-facing microphone $B_r(z)$.

In the second stage, called the control stage, the measurements done during the calibration stage are used to calculate the internal models $\tilde{S}(z)$, $\tilde{B}_r(z)$ and $\tilde{M}(z)$. These internal models are used by the ANC algorithm to make a real-time approximation of the sound pressure at the ear drum e(n) and use it as input to the ANC controller W(z) (see FIG. 2A).

When designing the ANC controller, it is assumed that W(z) is an finite impulse response (FIR) filter with N filter coefficients stacked in the vector w. The filter coefficients are calculated by solving the convex maximization problem in the DFT domain:

$$w=\arg\max_{w}\sum_{k=0}^{\frac{L_{DFT}}{2}-1}\sum_{c=1}^{C}\left|W(\Omega_k)\hat{S}(\Omega_k,c)\right|^2\left|\hat{M}_0(\Omega_k)\right|^2G_1^2(\Omega_k),$$

where $\hat{S}(\Omega_k,c)$ denotes the measured frequency responses of the secondary path, $\hat{M}_0(\Omega_k)$ denotes the nominal frequency response of the inward-facing-microphone-to-ear-drum transfer function without causality restrictions, k denotes the frequency index, $L_{DFT}$ denotes the DFT length, and $G_1(\Omega_k)$ denotes a frequency dependent function to weight the low frequencies more than the mid and high frequencies. In some examples, when deriving a controller W(z) that yields a stable system, a stability constraint is imposed. The solution space is restricted by a single-sided hyperbolic boundary formulated as an inequality between quadratic terms as $$|\varrho-W(\Omega_k)\tilde{S}(\Omega_k)|^2\le(|\varrho+W(\Omega_k)\tilde{S}(\Omega_k)|+2\cdot\rho)^2,$$

where $\tilde{S}(\Omega_k)$ is the frequency response of the internal model of the secondary path $\tilde{S}(z)$, $\varrho$ determines the focus ($-\varrho$, 0) and ρ the x-axis intersect (−ρ, 0) of the hyperbolic stability boundary. In addition, aiming at limiting the maximum gain of the controller W(z), the convex inequality constraint $$|W(\Omega_k)|^2\le G_3^{\,2}(\Omega_k)$$

is introduced, where $G_3(\Omega_k)$ denotes the maximum allowed gain. Feedback ANC approaches are generally subject to the water-bed effect and therefore prone to produce amplifications outside the attenuation bandwidth. Aiming at restricting such amplification, the present subject matter uses the following convex inequality constraint:

$$(|1+W(\Omega_k)\tilde{S}(\Omega_k)(1-\tilde{M}(\Omega_k)/\hat{M}_0(\Omega_k))|+\hat{U}_S(\Omega_k)|W(\Omega_k)\tilde{S}(\Omega_k)||\tilde{M}(\Omega_k)/\hat{M}_0(\Omega_k)|)^2\le G_2^{\,2}(\Omega_k)|1+W(\Omega_k)\tilde{S}(\Omega_k)|^2$$

for the optimization, where $G_2(\Omega_k)$ denotes the maximum allowed amplification and $\hat{U}(\Omega_k)$ denotes the multiplicative uncertainty in the secondary path that is calculated as $$\hat{U}_S(\Omega_k)=\max_c\left|\frac{\tilde{S}(\Omega_k)-\hat{S}(\Omega_{k,c})}{\tilde{S}(\Omega_k)}\right|.$$

This convex maximization problem subject to the aforementioned constraints can then be solved using sequential quadratic programming (SQP) algorithms. During optimizations the following parameters may be used: N=128 filter coefficients. $L_{DFT}$=8192, $\varrho$=0.8 and ρ=0.9, and the frequency-dependent functions $G_1(f)$, $G_2(f)$ and $G_3(f)$, as shown in FIG. 2B.

The present subject matter integrates $R_{cf}(f)$ in the design of the ANC controller to attenuate the direct sound leaking into the ear canal in the frequency range where comb-filter effect is likely to occur. First, the present subject matter integrates $R_{cf}(f)$ in the objective function:

$$w=\arg\max_{w}\sum_{k=0}^{\frac{L_{DFT}}{2}-1}\sum_{c=1}^{C}\left|W(\Omega_k)\hat{S}(\Omega_k,c)\right|^2\left|\hat{M}_0(\Omega_k)\right|^2|R_{cf}(\Omega_k)|^2G_1^2(\Omega_k),$$

as a frequency-weighting function that weights higher the frequencies where comb-filter effect is more likely to occur. Second, aiming at increasing the attenuation of the direct sound leaking into the ear canal in the frequency range where $R_{cf}(f)$ is high, the present subject matter strategically allows for more waterbed effect in the frequencies where $R_{cf}(f)$ is low, by calculating $G_2(\Omega_k)$ as follows:

$$G_2(\Omega_k)=\max_{\Omega_k}\left\{\hat{G}_2(\Omega_k),\left|\breve{R}_{cf}(\Omega_k)G_{cf}(\Omega_k)\right|^{-1}\right\},$$

where $\widehat{G}_2(\Omega_k)$ denotes the old parameter $G_2(\Omega_k)$ chosen as, for example, in FIG. 2B, $\breve{R}_{cf}(\Omega_k)$ denotes a version of $R_{cf}(f)$ that has been smoothed over frequency, and $G_{cf}(\Omega_k)$ denotes the minimum gap between the $R_{cf}(f)$ and the 0-dB line at the frequencies affected by the additional waterbed effect.

The present subject matter further performs hearing aid fitting using the characteristics of the designed ANC above. In a first example, to combine the signal generated by the ANC controller $y'_i(n)$ and the signal generated by the hearing aid $y'_f(n)$, both the ANC controller $$W_b(z) = \frac{W(z)}{1 + W(z)\hat{S}(z)}$$

and the hearing aid filter $W_f(z)$ work independently from each other and their signals $y'_i(n)$ and $y'_f(n)$ are added together just before being output to the receiver. In a second example, the signal from the hearing $y'_f(n)$ is fed into the algorithm of the ANC controller, to improve the estimation of the sound pressure generated by the external sound field at the position of the inward-facing microphone d(n).

In the first example above, a transfer function between the outward-facing and ear drum is calculated by:

$$H_{fi}(z) = \frac{E(z)}{X(z)} = \frac{(P(z) - S(z)W_f(z)) \cdot (1 - \hat{S}(z)W_b(z))}{1 + (B(z) - \hat{B}(z))W_b(z)}$$

In the second example above, the transfer function is calculated by:

$$H_{fido}(z) = \frac{E(z)}{X(z)} = \frac{P(z) \cdot (1 - \hat{S}(z)W_b(z)) - S(z)W_f(z)}{1 + (B(z) - \hat{B}(z))W_b(z)}$$

The present subject matter may apply the cancellation performance of ANC from the first example to obtain the modified leakage path:

$$P_{mod}(z) = P(z) + \frac{W_b(z) \cdot S(z) \cdot Q(z)}{1 - W_b(z)(B(z) - \hat{B}(z))},$$

where Q(z) denotes the outward-facing-to-inward-facing microphone transfer function relative to the external sound source.

The present subject matter may apply the cancellation performance of the second example to obtain a modified secondary path:

$$S_{mod}(z) = S(z)\left(1 + \frac{W_b(z)(B(z) - \hat{B}(z))}{1 - W_b(z)(B(z) - \hat{B}(z))}\right)$$

In various examples, the present subject matter uses the modified leakage path and the modified secondary path to update the acoustic properties of the device (e.g., vent-in and vent-out), re-estimate the gain, TK, and the compression ratio of the multi-channel compression for each band from the prescription formulas (NAL-NL2, etc.). This process results in fitting characteristics that take into account the characteristics of ANC. In the special case of a linear hear-through, the optimal hear-through filter can be obtained by, e.g., a linear least-squares problem with the solution:

$$W_f = \frac{P_{mod}(z) - H_t}{S_{mod}(z)}$$

Figure 2C:
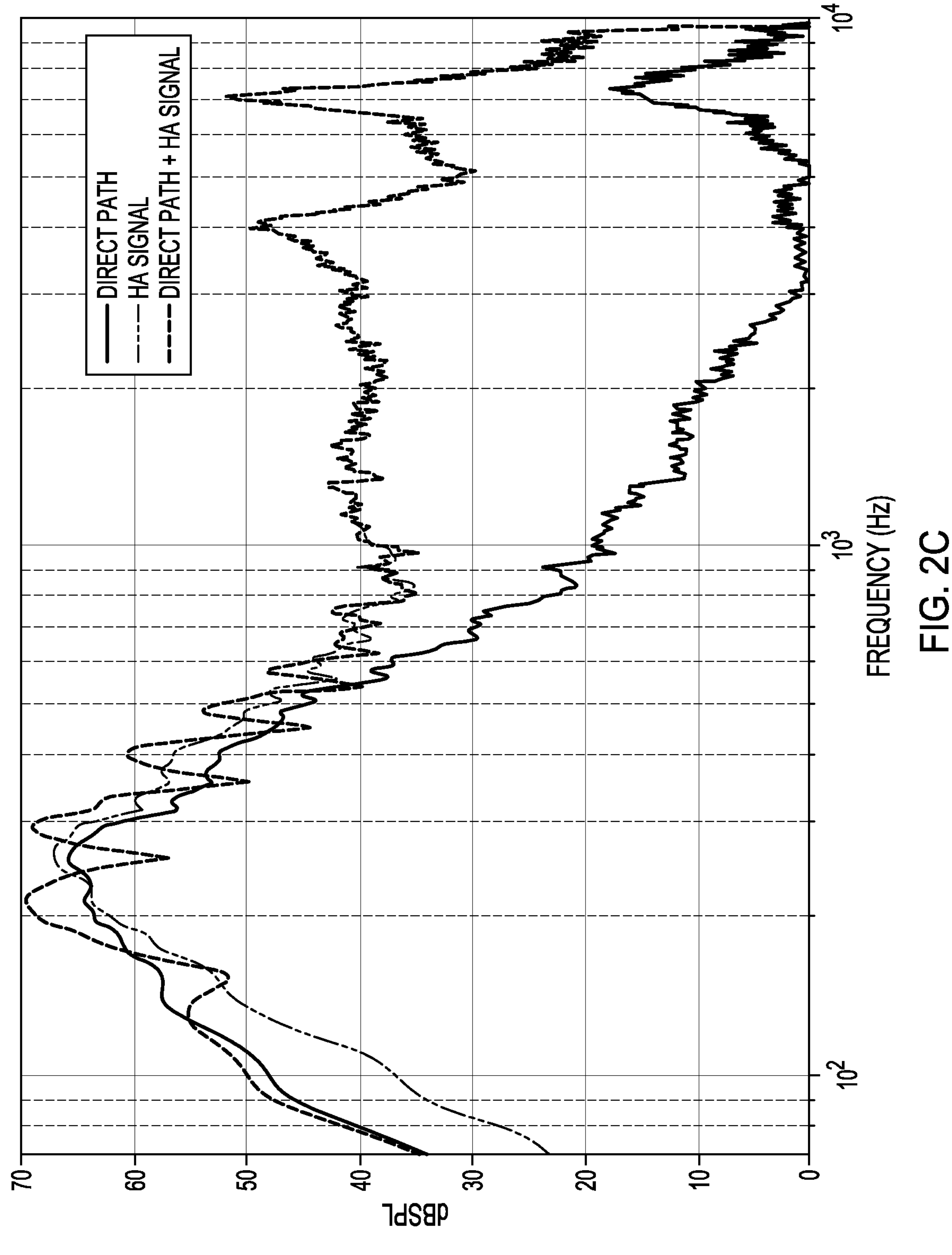
FIG. 2C illustrates a graphical diagram of reduction of the comb-filtering effect for hearing devices, according to various examples of the present subject matter.
Figure 2D:
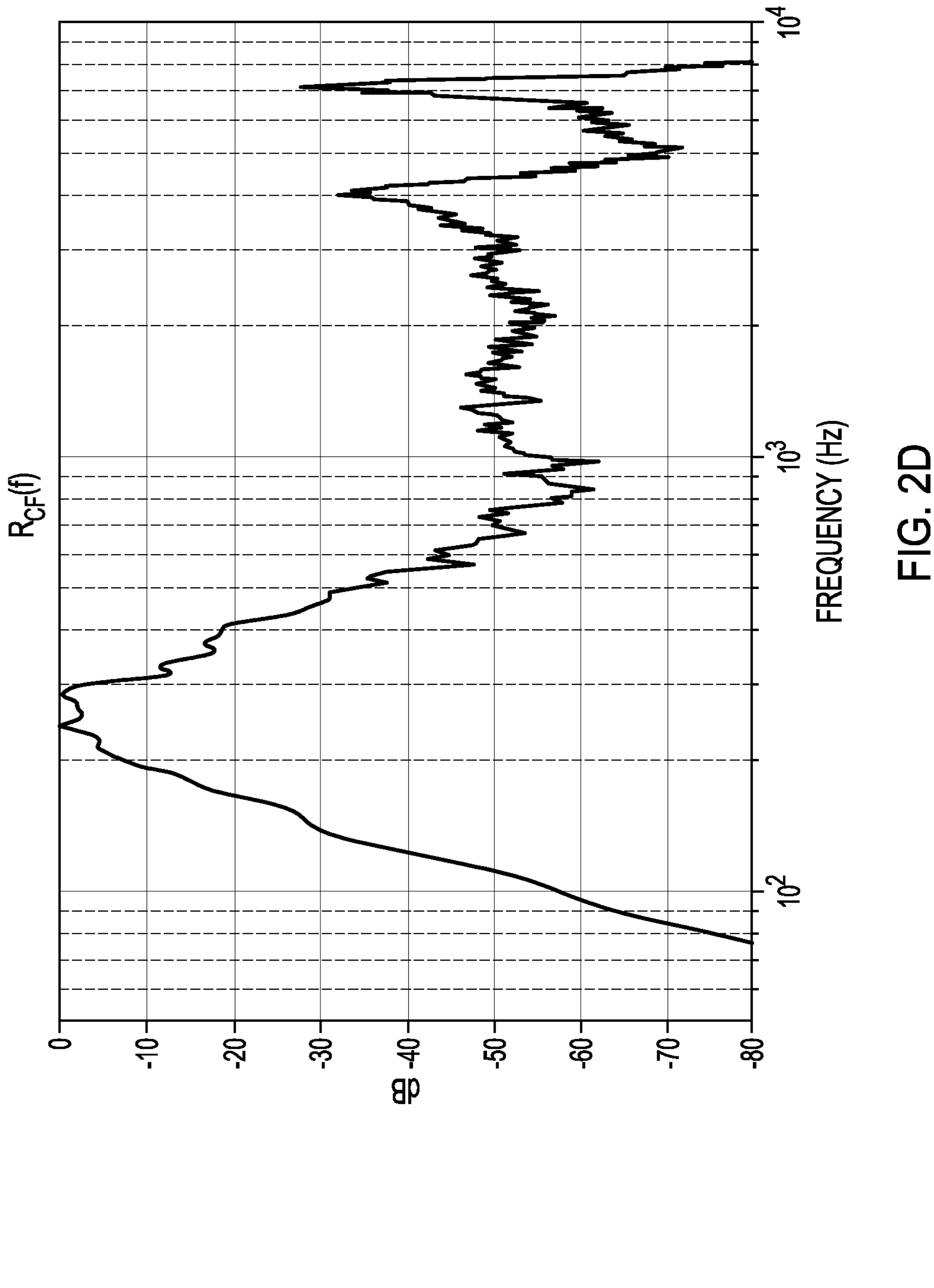
FIG. 2D illustrates a graphical diagram of a ratio of predicted sound pressure on the ear drum by the hearing processing signal and by the leakage path for a hearing device, according to various examples of the present subject matter.

The present subject matter may re-compute the comb-filtering effect and use the modified vent-in/vent-out functions by adjusting/fine-tuning the ANC controller until comb-filtering in the desired frequency range (e.g., below 1.5 kHz) is mitigated, as shown in FIG. 2C.

Figure 3:
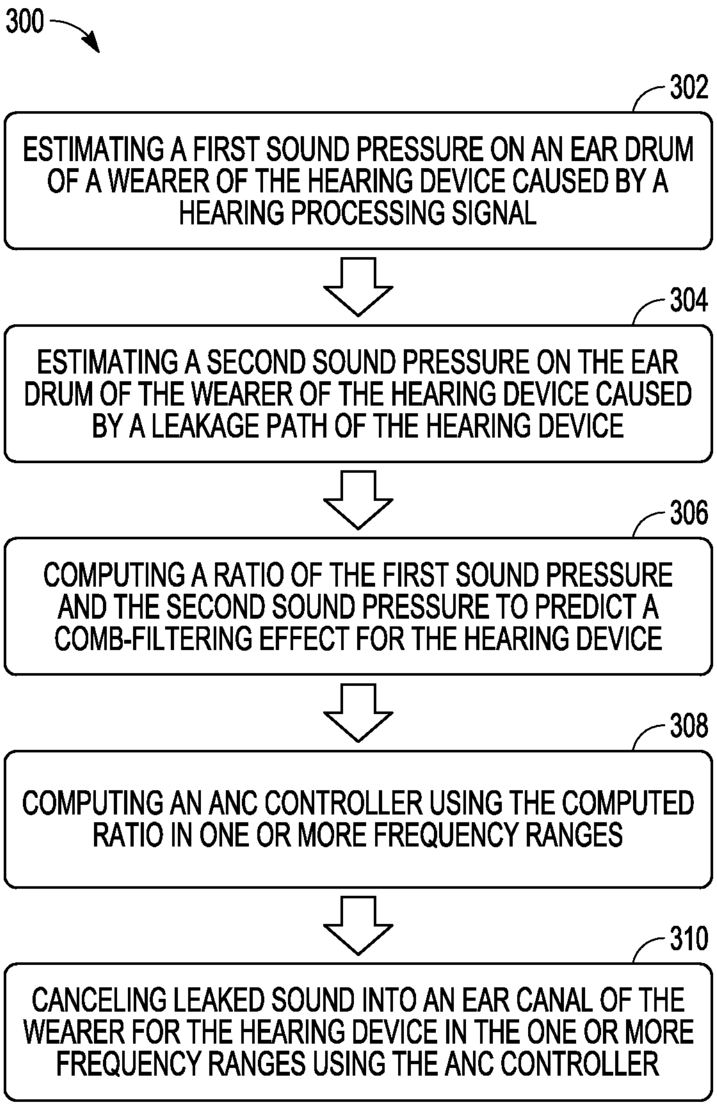
FIG. 3 illustrates a flow diagram of a method for active noise canceling for hearing device applications, according to various examples of the present subject matter.

FIG. 3 illustrates a flow diagram of a method for active noise canceling for hearing device applications, according to various examples of the present subject matter. The method 300 includes estimating a first sound pressure on an ear drum of a wearer of the hearing device caused by a hearing processing signal, at step 302. At step 304, the method 300 includes estimating a second sound pressure on the ear drum of the wearer of the hearing device caused by a leakage path of the hearing device. The method 300 further includes computing a ratio of the first sound pressure and the second sound pressure to predict a comb-filtering effect for the hearing device, at step 306. At step 308, the method 300 also includes computing an ANC controller using the computed ratio in one or more frequency ranges, and canceling leaked sound into an ear canal of the wearer for the hearing device in the one or more frequency ranges using the ANC controller, at step 310. In various embodiments, the leaked sound includes, but is not limited to, acoustic noise.

In various examples, the ANC controller is configured for use with a static feedback ANC, or with a static feedforward ANC, or both. Predicting the comb-filtering effect for the hearing device includes determining frequency range and ripple width of the comb-filtering effect, in various examples. Additionally or alternatively, the method 300 includes logging one or more of the first sound pressure, the second sound pressure, the ratio, or the computed ANC controller in an external storage location. In various examples, the external storage location includes cloud storage. Additionally or alternatively, the method 300 includes wirelessly communicating with an external device to transfer data to or from the external device. In various examples, wirelessly communicating with the external device includes using a Bluetooth® or Bluetooth® Low Energy (BLE) transceiver. Wirelessly communicating with the external device includes wireless communication with a smart phone, programmer, laptop, tablet, wearable device, server or other computing device, in various examples. In various examples, the hearing device includes a hearing aid, cochlear implant, bone conduction device, earbud, headphones or other type of hearing device.

Thus, using the above techniques, both the ANC controller and the hearing loss compensation gain are optimized to mitigate the comb-filtering effect, which improves the sound quality of hearing aids. In effect, the comb-filtering effect can be reduced more effectively without sacrificing the hearing aid processed sound in low frequency range. The present subject matter may be used for open fitting devices, standard ear buds, headphones, and may be combined with an auto-vent function. In various examples, different optimized ANC controllers are applied depending on open or closed mode.

The present subject matter may estimate transfer functions using the methods described herein. Other methods of estimating transfer functions may be used without departing from the scope of the present subject matter. The present algorithm can be wholly or partially implemented within firmware of a hearing device.

Various aspects of the present subject matter include a hearing device including a microphone and hearing assistance electronics, including one or more processors. The one or more processors are programmed to estimate a first sound pressure on an ear drum of a wearer of the hearing device caused by a hearing processing signal, estimate a second sound pressure on the ear drum of the wearer of the hearing device caused by a leakage path of the hearing device, and compute a ratio of the first sound pressure and the second sound pressure to predict a comb-filtering effect for the hearing device. The one or more processors are also programmed to compute an ANC controller using the computed ratio in one or more frequency ranges, and cancel leaked sound into an ear canal of the wearer for the hearing device in the one or more frequency ranges using the ANC controller.

The device also includes a wireless transceiver configured to communicate with the external device, in various examples. The wireless transceiver may include a Bluetooth® or Bluetooth® Low Energy (BLE) transceiver. Other types of wireless transceivers (or transmitters and receivers) may be used without departing from the scope of the present subject matter. In various examples, data is logged in an external storage location. The external storage location may include cloud storage, but other types of storage locations may be used without departing from the scope of the present subject matter. In various examples, the external device includes a smart phone or other computing device. Alternatively or additionally, the hearing device includes a hearing aid or other ear worn device, in various examples. The user's data and statistics are stored both on the hearing device and in a remote storage location, in various examples.

In binaural environments, the hearing device is configured to communicate with a second hearing device (such as in the opposite ear of the user) to coordinate adjustments and recommendations between left and right devices. Alternatively or additionally, each device performs ANC separately. Alternatively or additionally, one device acts as a master device to control adjustments and recommendations for the other device. Alternatively or additionally, the device communicates with a separate body worn device to provide processing of the methods of the present subject matter, with or without communicating with the external device. Other parameters and/or operational characteristics of the hearing device may be adjusted (or recommended to be adjusted) without departing from the scope of the present subject matter.

Figure 4:
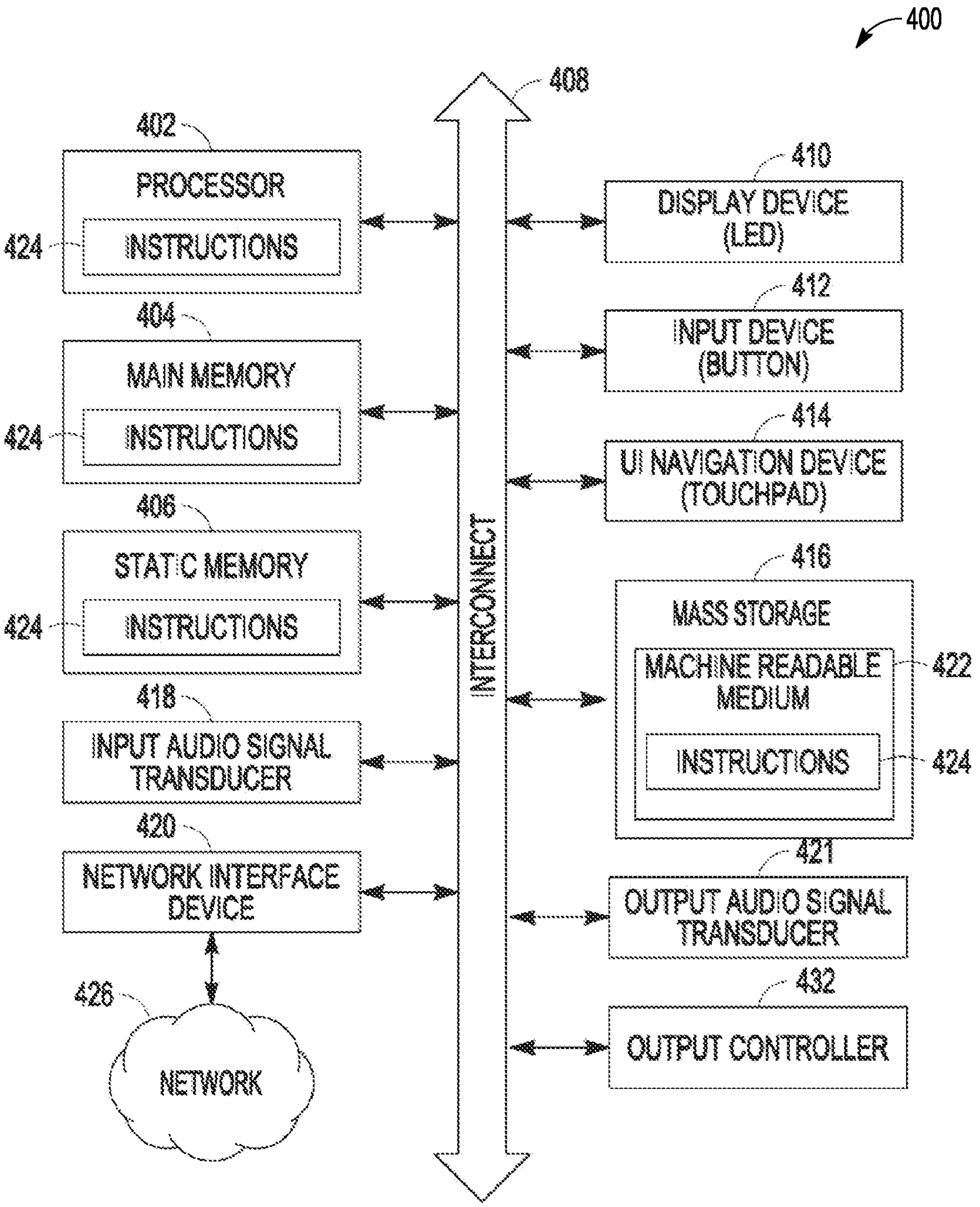
FIG. 4 illustrates a block diagram of an example machine upon which any one or more of the techniques discussed herein may perform.

FIG. 4 illustrates a block diagram of an example machine 400 upon which any one or more of the techniques (e.g., methodologies) discussed herein may perform. Alternatively or additionally, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, one or more input audio signal transducers 418 (e.g., microphone), a network interface device 420, and one or more output audio signal transducer 421 (e.g., speaker). The machine 400 may include an output controller 432, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (WEE) 802.11 family of standards known as Wi-Fi®, IEEE 802,16 family of standards known as WiMax®), IEEE 802.15.4 family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to communicate wirelessly using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 400, and includes digital or analog communications signals or other intangible medium to facilitate communication of such software.

Various examples of the present subject matter support wireless communications with a hearing device. In various examples the wireless communications may include standard or nonstandard communications. Some examples of standard wireless communications include link protocols including, but not limited to, Bluetooth™, Bluetooth™ Low Energy (BLE), IEEE 802.11 (wireless LANs), 802.15 (WPANs), 802.16 (WiMAX), cellular protocols including, but not limited to CDMA and GSM, ZigBee, and ultra-wideband (UWB) technologies. Such protocols support radio frequency communications and some support infrared communications while others support NFMI. Although the present system is demonstrated as a radio system, it is possible that other forms of wireless communications may be used such as ultrasonic, optical, infrared, and others. It is understood that the standards which may be used include past and present standards. It is also contemplated that future versions of these standards and new future standards may be employed without departing from the scope of the present subject matter.

The wireless communications support a connection from other devices. Such connections include, but are not limited to, one or more mono or stereo connections or digital connections having link protocols including, but not limited to 802.3 (Ethernet), 802.4, 802.5, USB, SPI, PCM, ATM, Fibre-channel, Firewire or 1394, InfiniBand, or a native streaming interface. In various examples, such connections include all past and present link protocols. It is also contemplated that future versions of these protocols and new future standards may be employed without departing from the scope of the present subject matter.

Hearing assistance devices typically include at least one enclosure or housing, a microphone, hearing assistance device electronics including processing electronics, and a speaker or "receiver." Hearing assistance devices may include a power source, such as a battery. In various examples, the battery is rechargeable. In various examples multiple energy sources are employed. It is understood that in various examples the microphone is optional. It is understood that in various examples the receiver is optional. It is understood that variations in communications protocols, antenna configurations, and combinations of components may be employed without departing from the scope of the present subject matter. Antenna configurations may vary and may be included within an enclosure for the electronics or be external to an enclosure for the electronics. Thus, the examples set forth herein are intended to be demonstrative and not a limiting or exhaustive depiction of variations.

It is understood that digital hearing assistance devices include a processor. In digital hearing assistance devices with a processor, programmable gains may be employed to adjust the hearing assistance device output to a wearer's particular hearing impairment. The processor may be a digital signal processor (DSP), microprocessor, microcontroller, other digital logic, or combinations thereof. The processing may be done by a single processor, or may be distributed over different devices. The processing of signals referenced in this application may be performed using the processor or over different devices. Processing may be done in the digital domain, the analog domain, or combinations thereof. Processing may be done using sub-band processing techniques. Processing may be done using frequency domain or time domain approaches. Some processing may involve both frequency and time domain aspects. For brevity, in some examples drawings may omit certain blocks that perform frequency synthesis, frequency analysis, analog-to-digital conversion, digital-to-analog conversion, amplification, buffering, and certain types of filtering and processing. In various examples of the present subject matter the processor is adapted to perform instructions stored in one or more memories, which may or may not be explicitly shown. Various types of memory may be used, including volatile and nonvolatile forms of memory. In various examples, the processor or other processing devices execute instructions to perform a number of signal processing tasks. Such examples may include analog components in communication with the processor to perform signal processing tasks, such as sound reception by a microphone, or playing of sound using a receiver (i.e., in applications where such transducers are used). In various examples of the present subject matter, different realizations of the block diagrams, circuits, and processes set forth herein may be created by one of skill in the art without departing from the scope of the present subject matter.

It is further understood that different hearing devices may embody the present subject matter without departing from the scope of the present disclosure. The devices depicted in the figures are intended to demonstrate the subject matter, but not necessarily in a limited, exhaustive, or exclusive sense. It is also understood that the present subject matter may be used with a device designed for use in the right ear or the left ear or both ears of the wearer.

The present subject matter is demonstrated for hearing devices, including hearing assistance devices, including but not limited to, behind-the-ear (BTE), in-the-ear (ITE), in-the-canal (ITC), receiver-in-canal (RIC), invisible-in-canal (IIC) or completely-in-the-canal (CIC) type hearing assistance devices. It is understood that behind-the-ear type hearing assistance devices may include devices that reside substantially behind the ear or over the ear. Such devices may include hearing assistance devices with receivers associated with the electronics portion of the behind-the-ear device, or hearing assistance devices of the type having receivers in the ear canal of the user, including but not limited to receiver-in-canal (RIC) or receiver-in-the-ear (RITE) designs. The present subject matter may also be used in hearing assistance devices generally, such as cochlear implant type hearing devices. The present subject matter may also be used in deep insertion devices having a transducer, such as a receiver or microphone. The present subject matter may be used in bone conduction hearing devices, in some examples. The present subject matter may be used in devices whether such devices are standard or custom fit and whether they provide an open or an occlusive design. It is understood that other hearing devices not expressly stated herein may be used in conjunction with the present subject matter.

OTHER NOTES AND EXAMPLES

Example 1 is a method for active noise cancellation (ANC) for a hearing device. The method includes estimating a first sound pressure on an ear drum of a wearer of the hearing device caused by a hearing processing signal, estimating a second sound pressure on the ear drum of the wearer of the hearing device caused by a leakage path of the hearing device, computing a ratio of the first sound pressure and the second sound pressure to predict a comb-filtering effect for the hearing device, computing an ANC controller using the computed ratio in one or more frequency ranges, and canceling leaked sound into an ear canal of the wearer for the hearing device in the one or more frequency ranges using the ANC controller.

In Example 2, the subject matter of Example 1 optionally includes wherein the ANC controller is configured for use with a feedback ANC.

In Example 3, the subject matter of Example 1 optionally includes wherein the ANC controller is configured for use with a feedforward ANC or a combination of feedback ANC and feedforward ANC.

In Example 4, the subject matter of Example 1 optionally includes wherein predicting the comb-filtering effect for the hearing device includes determining frequency range and ripple width of the comb-filtering effect.

In Example 5, the subject matter of Example 1 optionally further includes logging one or more of the first sound pressure, the second sound pressure, the ratio, or the computed ANC controller in an external storage location.

In Example 6, the subject matter of Example 5 optionally includes wherein the external storage location includes cloud storage.

In Example 7, the subject matter of Example 1 optionally further includes wirelessly communicating with an external device to transfer data to or from the external device.

In Example 8, the subject matter of Example 7 optionally includes wherein wirelessly communicating with the external device includes using a Bluetooth® or Bluetooth® Low Energy (BLE) transceiver.

In Example 9, the subject matter of Example 7 optionally includes wherein wirelessly communicating with the external device includes wirelessly communication with a smart phone.

In Example 10, the subject matter of Example 1 optionally includes wherein the hearing device includes a hearing aid.

Example 11 is a hearing device including a microphone and hearing assistance electronics, including one or more processors programmed to: estimate a first sound pressure on an ear drum of a wearer of the hearing device caused by a hearing processing signal, estimate a second sound pressure on the ear drum of the wearer of the hearing device caused by a leakage path of the hearing device, compute a ratio of the first sound pressure and the second sound pressure to predict a comb-filtering, effect for the hearing device, compute an ANC controller using the computed ratio in one or more frequency ranges, and cancel leaked sound into an ear canal of the wearer for the hearing device in the one or more frequency ranges using the ANC controller.

In Example 12, the subject matter of Example 11 optionally includes wherein one or more of the first sound pressure, the second sound pressure, the ratio, or the computed ANC controller are logged in an external storage location.

In Example 13, the subject matter of Example 11 optionally includes wherein the external storage location includes cloud storage.

In Example 14, the subject matter of Example 11 optionally further includes a wireless transceiver configured to communicate with an external device.

In Example 15, the subject matter of Example 14 optionally includes wherein the wireless transceiver includes a Bluetooth® or Bluetooth® Low Energy (BLE) transceiver.

In Example 16, the subject matter of Example 14 optionally includes wherein the external device includes a smart phone.

In Example 17, the subject matter of Example 11 optionally includes wherein the hearing device includes a hearing aid.

In Example 18, the subject matter of Example 11 optionally includes wherein the hearing device includes an earbud.

In Example 19, the subject matter of Example 11 optionally includes wherein the ANC controller is configured for use with a static feedback ANC.

In Example 20, the subject matter of Example 11 optionally includes wherein the ANC controller is configured for use with a static feedforward ANC, or a combination of static feedback ANC and static feedforward ANC.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A method for active noise cancellation (ANC) for a hearing device, the method comprising:
- estimating a first sound pressure on an ear drum of a wearer of the hearing device caused by a hearing processing signal;
- estimating a second sound pressure on the ear drum of the wearer of the hearing device caused by a leakage path of the hearing device;
- computing a ratio of the first sound pressure and the second sound pressure to predict a comb-filtering effect for the hearing device;
- computing an ANC controller using the computed ratio in one or more frequency ranges; and
- canceling leaked sound into an ear canal of the wearer for the hearing device in the one or more frequency ranges using the ANC controller.

2. The method of claim 1, wherein the ANC controller is configured for use with a feedback ANC.

3. The method of claim 1, wherein the ANC controller is configured for use with a feedforward ANC or a combination of feedback ANC and feedforward ANC.

4. The method of claim 1, wherein predicting the comb-filtering effect for the hearing device includes determining frequency range and ripple width of the comb-filtering effect.

5. The method of claim 1, further comprising logging one or more of the first sound pressure, the second sound pressure, the ratio, or the computed ANC controller in an external storage location.

6. The method of claim 5, wherein the external storage location includes cloud storage.

7. The method of claim 1, further comprising wirelessly communicating with an external device to transfer data to or from the external device.

8. The method of claim 7, wherein wirelessly communicating with the external device includes using a Bluetooth® or Bluetooth® Low Energy (BLE) transceiver.

9. The method of claim 7, wherein wirelessly communicating with the external device includes wirelessly communication with a smart phone.

10. The method of claim 1, wherein the hearing device includes a hearing aid.

11. A hearing device, comprising:
- a microphone; and
- hearing assistance electronics, including one or more processors programmed to:
  - estimate a first sound pressure on an ear drum of a wearer of the hearing device caused by a hearing processing signal;
  - estimate a second sound pressure on the ear drum of the wearer of the hearing device caused by a leakage path of the hearing device;
  - compute a ratio of the first sound pressure and the second sound pressure to predict a comb-filtering effect for the hearing device;
  - compute an ANC controller using the computed ratio in one or more frequency ranges; and
  - cancel leaked sound into an ear canal of the wearer for the hearing device in the one or more frequency ranges using the ANC controller.

12. The hearing device of claim 11, wherein one or more of the first sound pressure, the second sound pressure, the ratio, or the computed ANC controller are logged in an external storage location.

13. The hearing device of claim 12, wherein the external storage location includes cloud storage.

14. The hearing device of claim 11, further comprising a wireless transceiver configured to communicate with an external device.

15. The hearing device of claim 14, wherein the wireless transceiver includes a Bluetooth® or Bluetooth® Low Energy (BLE) transceiver.

16. The hearing device of claim 14, wherein the external device includes a smart phone.

17. The hearing device of claim 11, wherein the hearing device includes a hearing aid.

18. The hearing device of claim 11, wherein the hearing device includes an earbud.

19. The hearing device of claim 11, wherein the ANC controller is configured for use with a static feedback ANC.

20. The hearing device of claim 11, wherein the ANC controller is configured for use with a static feedforward ANC, or a combination of static feedback ANC and static feedforward ANC.

* * * * *